United States Patent [19]

Sakurai

[11] Patent Number: 4,715,597
[45] Date of Patent: Dec. 29, 1987

[54] AUTOMATIC DOCUMENT FEEDER

[75] Inventor: Yasuo Sakurai, Atsugi, Japan

[73] Assignee: Ricoh Company, Ltd., Tokyo, Japan

[21] Appl. No.: 841,182

[22] Filed: Mar. 19, 1986

[30] Foreign Application Priority Data

Mar. 19, 1985 [JP] Japan ................................. 60-53303
Apr. 1, 1985 [JP] Japan ................................. 60-66587

[51] Int. Cl.⁴ .......................................... B65H 3/52
[52] U.S. Cl. ................................................ 271/122
[58] Field of Search ........................ 271/121, 122, 125

[56] References Cited

U.S. PATENT DOCUMENTS

| 2,214,752 | 9/1940 | Pierce | 271/122 X |
| 4,494,747 | 1/1985 | Graef | 271/122 X |
| 4,496,145 | 1/1985 | Fukui | 271/122 |
| 4,515,358 | 5/1985 | Fukui | 271/122 |
| 4,560,154 | 12/1985 | Nogi | 271/122 X |

FOREIGN PATENT DOCUMENTS 198242 11/1984 Japan ................................. 271/122

Primary Examiner—Richard A. Schacher
Attorney, Agent, or Firm—Oblon, Fisher, Spivak, McClelland, & Maier

[57] ABSTRACT

An automatic document feeder includes a separating roller disposed adjacent to one end of a table on which a stack of documents to be fed is placed for separating the bottom-most document from the stack. The feeder also includes a feed roller which is fixedly mounted on a first shaft on which the separating roller is fixedly mounted. A friction roller is rotatably supported as being pressed against the separating roller and a transport roller is rotatably provided as being pressed against the feed roller. The separating and feed rollers are provided coaxially, but they are comprised of different materials to provide a stable document feeding operation. The separating roller is preferably comprised of a rubber material having a hardness ranging from 25 to 30 degrees, and the feed roller is preferably comprised of a chloroprene material having a hardness on the order of 60 degrees. If the separating roller is split into two sub-rollers spaced apart axially, the feeder is preferably provided with an auxiliary roller in the space between the sub-rollers and coaxially with the transport roller so as to provide a smooth feed operation irrespective of the thickness of the document.

8 Claims, 7 Drawing Figures

AUTOMATIC DOCUMENT FEEDER

BACKGROUND OF THE INVENTION

1. Field of the Invention

This invention relates to a device for feeding a document automatically, and, in particular, to an automatic document feeder suitable for use in feeding a stack of original documents or sheets of transfer mediums one by one in an imaging apparatus, such as a facsimile machine or a copier.

2. Description of the Prior Art

Recent facsimile machines and copiers are typically equipped with a fully automatic document feeding device which can feed a stack of original documents one by one in succession. Such an automatic document feeder, or simply ADF, generally includes three functional sections: document separating section, document feeding section, and document transporting section. Prior art automatic document feeders are typically large in size as well as in the number of parts, so that they are difficult to manufacture and unreliable in operation.

SUMMARY OF THE INVENTION

In accordance with the present invention, there is provided an automatic document feeder suitably for use in an imaging apparatus, such as facsimile machine or copier, for feeding a stack of original documents one by one in succession, which includes a separating roller rotatably supported and disposed at one end of a table for placing thereon a stack of documents to be fed; a friction roller rotatably supported and resiliently pressed against the separating roller; a feed roller disposed at the end of the table and coaxial with the separating roller; a transport roller rotatably supported and pressed against the feed roller; a reversibly driving source operatively coupled to provide driving power to said rollers selectively depending on the direction of rotation. Preferably, the separating roller is comprised of a rubber material having a hardness ranging from 25 to 30 degrees. And, the feed roller is preferably comprised of a chloroprene rubber material having a hardness of approximately 60 degrees. In accordance with another aspect of the present invention, the automatic feeder further includes an auxiliary roller disposed approximately at the center of the end of the table and coaxial with the transport roller. In the preferred embodiment, the separating roller is split into a pair of sub-rollers spaced apart from each other over a predetermined distance and the auxiliary roller is located between the pair of sub-rollers, wherein the auxiliary roller preferably has a diameter slightly larger than the diameter of the transport roller so that the auxiliary roller partly overlaps with the sub-rollers when projected in a plane normal to the rotating axis of the auxiliary roller.

It is therefore a primary object of the present invention to provide an improved automatic document feeder.

Another object of the present invention is to provide an automatic document feeder compact in size, fewer in the number of parts and reliable in operation.

Other objects, advantages and novel features of the present invention will become apparent from the following detailed description of the invention when considered in conjunction with the accompanying drawings.

DESCRIPTION OF THE PREFERRED EMBODIMENTS

Figure 1:
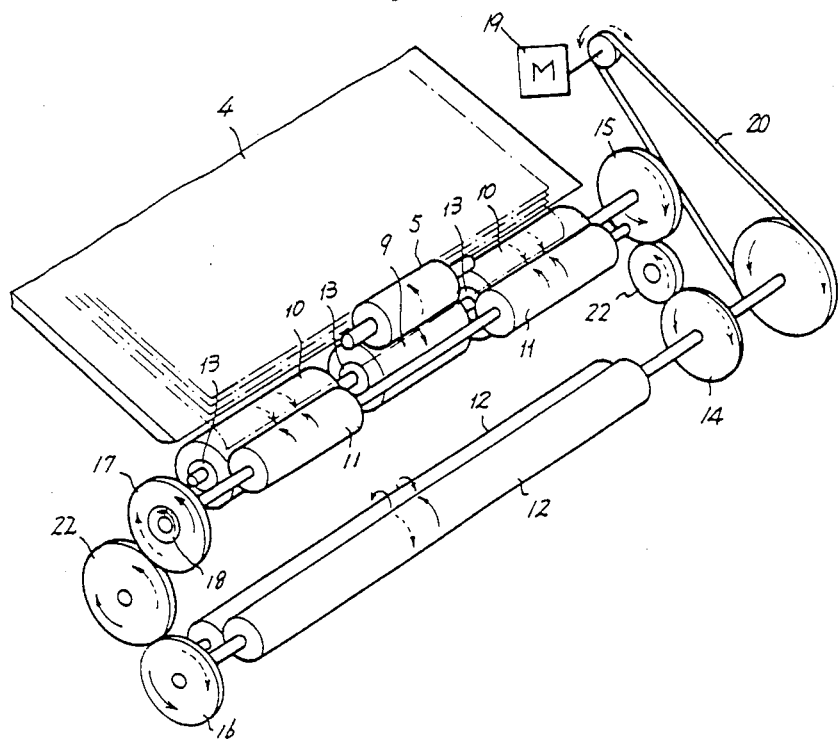
FIG. 1 is a schematic, perspective view showing the overall structure of an automatic document feeder showing the fundamental structure of the present invention.

Referring now to FIG. 1, there is schematically shown in perspective an automatic document feeder which includes a stepping motor 19 which may be driven to rotate in a normal direction or reversed direction selectively. In the first place, when the stepping motor 19 is driven to rotate in the normal direction as indicated by the dotted line arrow, the driving power is transmitted to a separating roller 9 and to a pair of feed rollers 10, 10, which are disposed on both sides of the separating roller 9 and coaxially therewith, through an endless belt 20 and meshed gears 14, 22 and 15. It is to be noted that the gear 15, separating roller 9 and feed rollers 10, 10 are fixed mounted on the same shaft which is rotatably supported by any well known means. In addition, in the illustrated embodiment, the separating roller 9 is disposed approximately at the center of one end of a table on which a stack of documents 4 to be fed is placed. Also provided is a pair of transport rollers 11, 11, each of which is fixedly mounted on a second shaft extending in parallel with the shaft on which the separating and feed rollers 9 and 10 are fixedly mounted and is pressed against the corresponding one of the pair of feed rollers 10, 10. A one-way clutch 18 is mounted at the left end of this second shaft and it allows the second shaft to rotate freely counterclockwise as viewing into FIG. 1 so that the transport rollers 11 are driven to rotate in the direction indicated by the arrows through pressure contact with the respective feed rollers 10, 10.

A friction roller 5 is rotatably provided as pressed against the separating roller 9 with its rotating axis extending in parallel with the rotating axis of the first shaft on which the separating and feed rollers 9 and 10 are fixedly mounted. The pressure imparted to the separating roller 9 by the friction roller 5 is set at a level which is slightly larger than the level of friction force between the two adjacent documents in a stack, and the pressure between the friction roller 5 and the separating roller 9 is typically set in the order of 150 grams. In the illustrated structure, the friction roller 5 is disposed above and in rolling contact with the separating roller 9 and the second shaft with the transport rollers 11, 11 is disposed at the side opposite to the side of the table for placing thereon a stack of documents 4 to be fed. With this structure, when the separating roller 9, together with the pair of feed rollers 10, 10 on both sides, is driven to rotate, a sheet of document 4 is picked up and it is fed between the friction roller 5 and the separating roller 9. Since the friction roller 5 is resiliently pressed against the separating roller 9 by any well known means, such as spring, and it is rotatably supported, the friction roller 5 rotates in the direction indicted by the arrow as a single sheet of document 4 placed on the table is caused to advance in the feed direction. If there are a number of documents 4 in the form of a stack on the table, the bottom-most sheet of document is picked up by the separating roller 9 when it is driven to rotate by the motor 19 with the rest being kept stationary by the friction roller 5, in which case the friction roller 5 also remains non-rotating.

Then, the stepping motor 19 is driven to rotate in the reversed direction as indicated by the solid line arrow. This rotational power is transmitted to the second shaft, on which the transport rollers 11, 11 are fixedly mounted, through meshed gears 16, 22, and 17. As a result, the driving and driven sides of the present system become reversed when the direction of rotation of the motor 19 is reversed. Under this condition, the sheet of document 4 fed as sandwiched between the feed rollers 10 and transport rollers 11 come to be nipped between and thus further transported by a pair of advancement rollers 12, 12 which is disposed downstream of the feed and transport rollers 10 and 11 with respect to the direction of transportation of the sheet of document 4. In a manner described above, the documents placed on the table in the form of a stack are first separated, fed, and transported one by one in succession.

Figure 2:
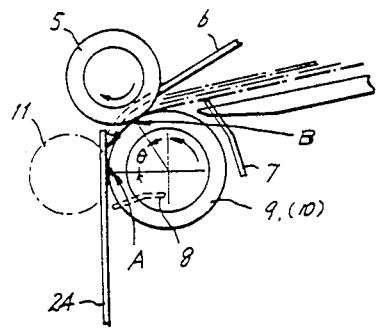
FIG. 2 is a schematic, side elevational view showing a selected portion of the structure shown in FIG. 1.

It is to be noted, however, that the paper feeding performance sometimes fluctuates depending on the difference in friction coefficient between the rollers and the document 4, which mainly arises from the properties of the document, such as thickness, surface roughness or the like. Described more in detail in this respect with reference to FIG. 2, a cooperation between the friction roller 5 and the separating roller 9 causes the bottom-most sheet of document 4 in a stack on the table to be picked and separated from the stack. Then, the separating roller 9 causes the thus separated sheet of document 4 to be fed until the leading edge of the sheet of document 4 reaches a point A where the feed rollers 10 are in rolling contact with the transport rollers 11. However, while the sheet of document 4 is being transported from a point B, where the friction roller 5 is in rolling contact with the separating roller 9, to the point A, where the feed rollers 10 are in rolling contact with the feed rollers 11, the sheet of document 4 is caused to advance due to the friction or contact between the sheet of document 4 and the separating roller 9. Thus, the feed performance of the sheet of document 4 in this region could vary depending on the thickness or stiffness and the surface condition or roughness of the sheet of paper 4. For this purpose, it is preferable to set the hardness and the surface condition of each of the separating and feed rollers 9 and 10 at an appropriate range so that the feeding performance remains substantially the same even if the conditions of the documents 4 to be fed vary.

Figure 3:
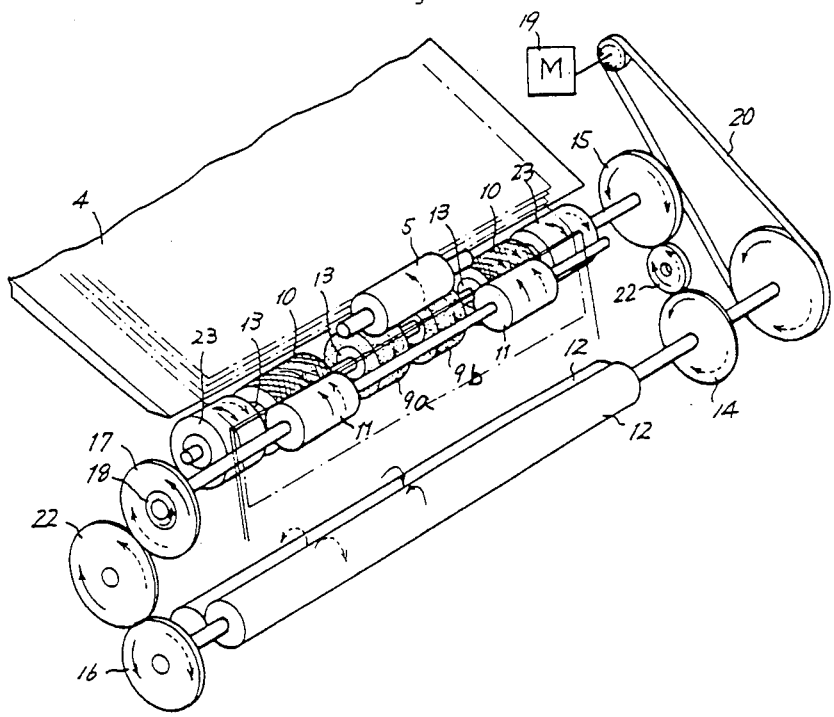
FIG. 3 is a schematic, perspective view showing an automatic document feeder constructed in accordance with one embodiment of the present invention.
Figure 4:
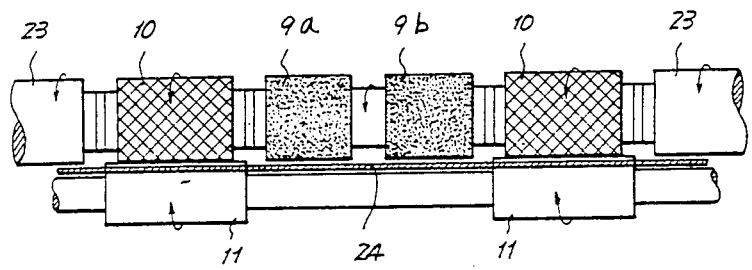
FIG. 4 is a schematic, plan view showing a selected section of the structure shown in FIG. 3.

FIG. 3 schematically shows an automatic document feeder constructed in accordance with one embodiment of the present invention which is so structured to provide a stable document feeding performance irrespective of the conditions of documents to be fed. It should be noted that the structure shown in FIG. 3 is similar in many respects to the structure shown in FIG. 1, so that like numerals are used to indicate like elements as practiced throughout the present specification and drawings.

In the structure shown in FIG. 3, the separating roller 9 is slit into a pair of sub-rollers 9a and 9b which are spaced apart over a predetermined distance from each other in the axial direction of the first shaft. Also provided additionally is a pair of idler rollers 23, 23, which are mounted on the first shaft as being freely rotatable. The idler rollers 23 and 23 are disposed at the extreme edges of the end of the table so that the feed rollers 10 and 10 are made somewhat shorter in length. It is to be noted that the transport rollers 11, 11 are pressed against the respective feed rollers 10, 10, and not against the idler rollers 23, 23 in the illustrated structure. The remaining structure is identical to the structure shown in FIG. 1. The separating sub-rollers 9a and 9b are comprised of a material having an increased adherence to the sheet of document 4, and, the preferred material for the separating sub-rollers 9a and 9b includes rubber having a hardness in a range between 25 and 30 degrees. The rubber sub-rollers 9a and 9b are also each preferably provided with a peripheral surface which is roughened at least slightly. Sponge has an increased adherence, but if sponge is used for the sub-rollers 9a and 9b, they will be significantly deformed due to the force applied by the friction roller 5, so that it could impair the feeding performance of the sheet of document 4.

Since the separating roller 9 is comprised of a rubber material having an appropriate hardness, the sheet of document 4 may keep a good contact with the separating roller 9 until its leading edge reaches the point A where the transport rollers 11, 11 are in rolling contact with the feed rollers 10, 10. Such a structure allows one to form the feed and transport rollers 10 and 11 from a relatively inexpensive material, such as chloroprene, having a hardness in the neighborhood of 60 degrees. The idlers 23, 23 may be preferably comprised of an appropriate resin material because they do not positively participate in the function of transportation of the sheet of document 4.

Figure 5:
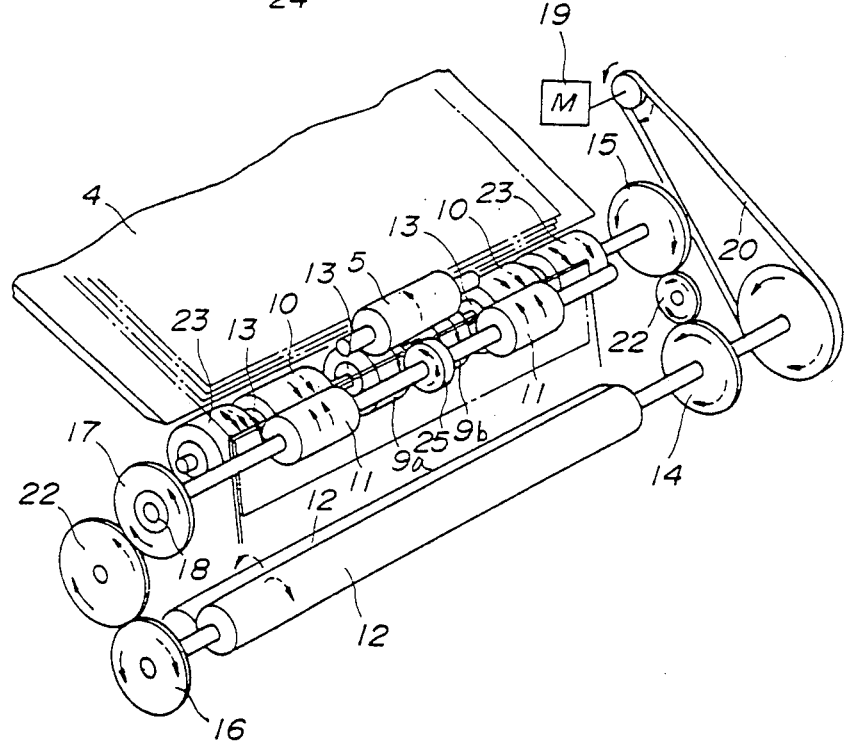
FIG. 5 is a schematic, perspective view showing an automatic document feeder constructed in accordance with another embodiment of the present invention.
Figure 7:
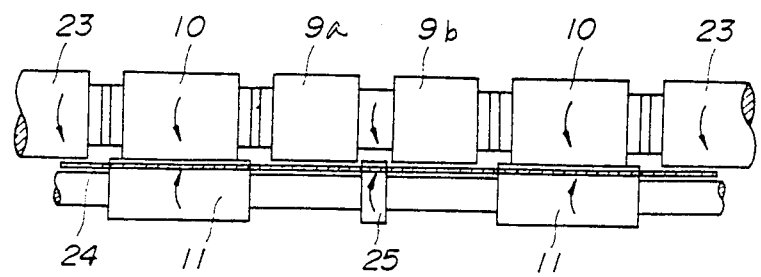
FIG. 7 is a schematic, plan view of the structure shown in FIG. 6.

FIG. 5 shows another embodiment of the present invention and this automatic document feeder is also structurally very similar to the previously described embodiments. The embodiment shown in FIG. 5 differs structurally from the embodiment shown in FIG. 3 only on the point that an auxiliary roller 25 is provided between and coaxially with the pair of transport rollers 11, 11 in the embodiment shown in FIG. 5. That is, as shown in FIG. 5, in accordance with the present embodiment, the auxiliary roller 25 is fixedly mounted on and approximately at the center of the second shaft as located between the pair of transport rollers 11, 11. The auxiliary roller 25 is so structured to have a diameter which is slightly larger than the diameter of the transport rollers 11, 11, so that the auxiliary roller 25 slightly projects into the space between the split sub-rollers 9a and 9b in the radial direction by the amount equivalent to the difference between the diameter of the auxiliary roller 25 and the diameter of the transport rollers 11, 11, as best shown in FIG. 7.

Figure 6:
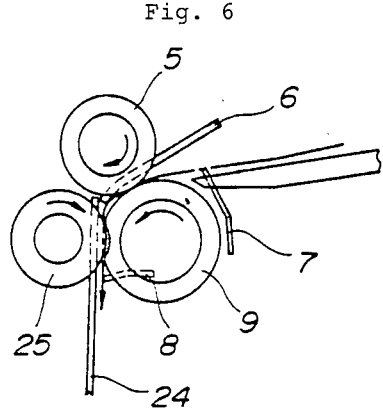
FIG. 6 is a schematic, side elevational view showing a selected portion of the structure shown in FIG. 5.

With this structure, if a sheet of document 4 is relatively thick, the sheet of document 4 being fed comes into contact with the auxiliary roller 25 before coming into contact with a guide plate 24, which extends straight in the downward direction, and, since the auxiliary roller 25 is coaxially provided with the transport rollers 11, 11, the sheet of document 4 is fed as assisted by the rotation of the auxiliary roller 25 until its leading edge comes to the point where the feed rollers 10, 10 are in contact with the respective transport rollers 11, 11. If the sheet of document 4 to be fed is relatively thin, since the central portion of the sheet of document 4 is partly lifted to form a small straight ridge, the sheet of document 4 is insured to be transported straight in a uniform state, thereby preventing any possible occurrence of skew and noises during transportation. It is to be noted that elements indicated by 7 and 8 in FIG. 6 are guide members for guiding the advancement of the sheet of document 4 along a predetermined path.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An automatic document feeder comprising:
    a separating roller rotatably supported at one end of a table for placing thereon a stack of sheets of documents to be fed;
    a friction roller rotatably supported and pressed against said separating roller;
    a feed roller rotatably supported and coaxial with said separating roller;
    a transport roller rotatably supported and pressed against said feed roller;
    driving means for driving to rotate said separating, feed and transport rollers selectively depending on a direction of rotation; and
    wherein said separating roller is comprised of a material different from that of said feed roller.

2. The feeder of claim 1 wherein said separating roller is comprised of a rubber material having a hardness in a range between 25 and 30 degrees.

3. The feeder of claim 2 wherein said feed roller is comprised of a chloroprene rubber material having a hardness on the order of 60 degrees.

4. An automatic document feeder comprising:
    a split separating roller rotatably supported at one end of a table for placing thereon a stack of sheets of documents to be fed, said split separating roller including a pair of sub-rollers spaced apart over a predetermined distance therebetween in an axial direction thereof;
    a friction roller rotatably supported and pressed against said split separating roller;
    a feed roller rotatably supported and coaxial with said split separating roller;
    a transport roller rotatably supported and pressed against said feed roller;
    an auxiliary roller located between said sub-rollers and rotatably supported coaxially with said transport roller; and
    driving means for driving to rotate said split separating, feed, transport and auxiliary rollers selectively depending on a direction of rotation.

5. The feeder of claim 4 wherein said auxiliary roller is slightly larger in diameter than said transport roller.

6. The feeder of claim 5 wherein said driving means includes a reversibly rotatable motor and a first power transmitting train operatively coupled from said motor to a first shaft on which said separating and feed rollers are fixedly mounted coaxially and a second power transmission train operatively coupled from said motor to a second shaft on which said transport and auxiliary rollers are fixedly mounted coaxially.

7. The feeder of claim 6 wherein said second power transmission train includes a one-way clutch.

8. The feeder of claim 4 wherein said split separating roller is comprised of a material different from that of said feed roller.

* * * * *